May 11, 1965   H. B. HORTON   3,182,674
SYSTEM AND APPARATUS FOR PRODUCING, MAINTAINING AND
CONTROLLING LAMINAR FLUID STREAM FLOW
Filed July 24, 1961   2 Sheets-Sheet 1

INVENTOR
H. BURKE HORTON

BY *Griffin and Stokes*
ATTORNEYS

INVENTOR
H. BURKE HORTON

BY Griffin and Stokes
ATTORNEYS

United States Patent Office 3,182,674
Patented May 11, 1965

3,182,674
SYSTEM AND APPARATUS FOR PRODUCING, MAINTAINING AND CONTROLLING LAMINAR FLUID STREAM FLOW
Harold Burke Horton, Norwalk, Conn., assignor to Sperry Rand Corporation, New York, N.Y., a corporation of Delaware
Filed July 24, 1961, Ser. No. 126,214
3 Claims. (Cl. 137—81.5)

This invention relates to a system and apparatus for effectively producing, maintaining and controlling laminar flow of a fluid stream.

This invention also relates to a system and apparatus including improved fluid conveying means for effectively producing maintaining and controlling laminar flow of a fluid stream through a pressure vessel.

More particularly, this invention relates to a system and apparatus for effectively producing, maintaining and controlling laminar flow of a fluid stream through components of pure fluid or fluid-actuated control systems. Such components may be fluid amplifiers of the type described in the publication Science and Mechanics, June 1960.

It is believed to be well established that in most all fluid systems it is desirable that the fluid stream flow be laminar rather than turbulent. Laminar flow is particularly desirable in fluid amplifier systems used as control devices, amplifiers, analog computers, digital computers, or signalling devices. Laminar flow decreases internal heating, preserves the signal strength, and increases the reliability of fluid systems. Laminar flow also reduces the input power required and enables the fluid supply to be maintained at a pressure substantially lower than that pressure normally required for the operation of a similar system. It also permits fluid flow through smaller fluid conveying means for any given pressure of the power supply, and enables the selected system to be effectively operable through streams which may flow through fluid conveying means which are of a length substantially longer than the fluid conveying means presently being employed in similar systems.

An object of this invention is to provide a system which effectively creates, maintains and controls laminar flow of a fluid stream through suitable fluid conveying means.

It is also a further object of this invention to provide a system and apparatus which creates, maintains and controls laminar flow of a fluid stream through a pressure vessel.

An additional object of this invention is to provide a system for creating, maintaining and controlling laminar flow of a fluid stream through fluid conveying means in a component of a fluid control system.

A still further object of this invention is to provide apparatus having improved fluid conveying means which effectively creates, maintains and controls laminar flow of a fluid stream.

Still another object of this invention is to provide apparatus for a component of a fluid control system which creates, maintains and controls laminar flow in a fluid stream through the component of the fluid control system, said apparatus having means for selectively creating turbulence in said fluid stream for the purpose of controlling said component.

Another object of the invention is to provide apparatus having improved means for cooling a fluid system and for reducing the amount of heat generated within said fluid system as a result of fluid friction.

In order to acquire the advantages and accomplish the objects as stated above, the system and apparatus of this invention comprises; providing a primary object, such as a pipe, pressure vessel, component of a fluid control system, or the like, with an enclosed space and disposing fluid conveying means in the space within the confines of the primary object in a manner which will define a pressure zone between the primary object and the fluid conveying means. The fluid conveying means is provided with a porous portion and a passageway through which a fluid stream may pass. Fluid means may be placed within the pressure zone and within the passageway with that part of the fluid means which is placed within the pressure zone acting as a control fluid which creates, maintains and controls laminar flow in that part of the fluid means which may be passing through the passageway as the fluid stream. Means are provided for creating and maintaining a pressure differential or gradient between the fluid pressures of the control fluid in the pressure zone and the fluid stream in the passageway to induce, force, urge, or in some diverse way cause the fluid means to leak, seep, flow or pass through the porous portion of the fluid conveying means between the pressure zone and the passageway and effectively create, maintain and control laminar flow in the fluid stream. More particularly, the fluid conveying means of this invention comprises an elongated open ended substantially solid member having at least one portion thereof formed from a porous material and which is also provided with at least one substantially unobstructed generally longitudinally extending passageway through which the selected fluid stream may pass in laminar flow. Further, such fluid conveying means is disposed within the confines of the primary object in the space that is defined thereby in spaced relationship thereto and defines therewith the pressure zone wherein the control fluid may be placed under a desired given pressure.

Other objects and important features of this invention will be apparent from a study of the specification following taken with the drawing which together disclose, describe and illustrate a plurality of preferred embodiments or modifications of the invention and what is now considered to be the best mode of practicing the principles thereof. Still other embodiments or modifications of this invention may be suggested to those having the benefit of the teachings herein and such other embodiments or modifications are intended to be reserved especially as they fall within the scope and spirit of the subjoined claims.

Figure 3:
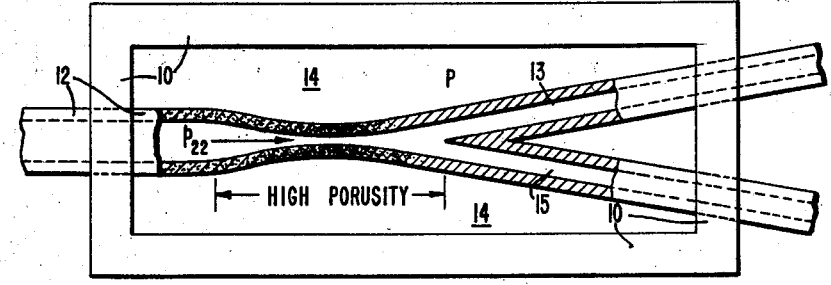
FIGURES 3 and 4 are partial sectional views similar to FIGS. 1 and 2 illustrating another embodiment or modification of the system and apparatus of this invention.
Figure 4:
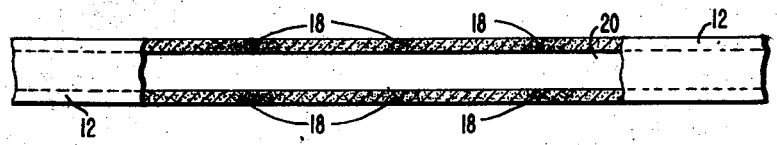
Figure 5:
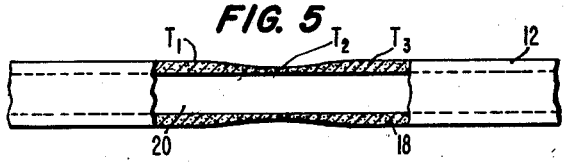
Figure 6:
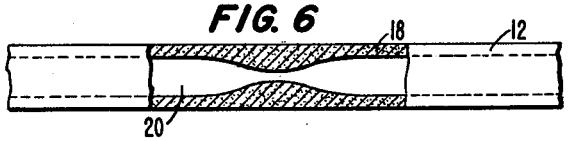
Figure 7:
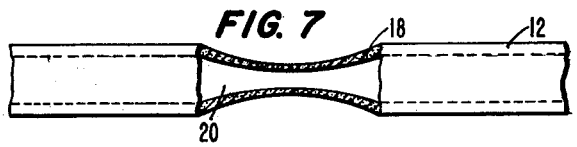
Figure 8:
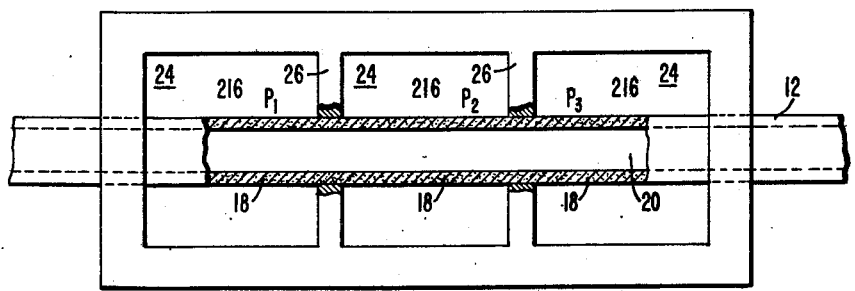
Figure 9:
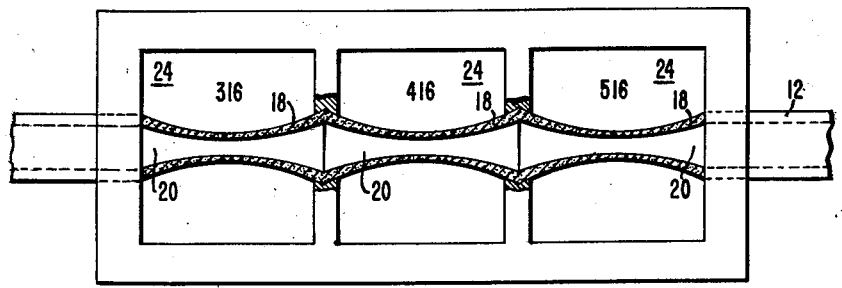

FIGURES 5, 6, and 7 are partial sectional views similar to FIGS. 1–4 illustrating an additional embodiment or modification of the system and apparatus of this invention, and FIGURES 8 and 9 are partial sectional views similar to FIGS. 1–7 illustrating a still further embodiment or modification of this invention.

Attention is now directed to the drawing wherein the figures thereof represent various embodiments or modifications which the system and apparatus of this invention may take in actual practice and for the sake of brevity those features and that structure which are common to the various embodiments or modifications of the invention will first be described and disclosed.

In each of the embodiments or modifications, as illustrated in the figures of the drawing, a primary object 10, such as a pipe, pressure vessel, component of a fluid control system, or the like, is provided with an enclosed space. Suitable means, not illustrated, positions fluid conveying means 12 in the enclosed space within the confines of the primary object 10 with the fluid conveying means being disposed therein in spaced relationship to the primary object 10 in a manner to define therewith a pressure zone 14 wherein a suitable control fluid 16 may be placed under a desired given pressure P.

The fluid conveying means 12 comprises an elongated open ended substantially solid member having at least one portion 18 thereof formed from a porous material and which is also provided with at least one generally longitudinally extending passageway 20 through which passes a selected fluid stream 22 under a pressure $p$.

It is to be understood that in each of the embodiments or modifications as illustrated in the figures of the drawing that the control fluid pressure P differs from the fluid stream pressure $p$ and that means, not illustrated, such as a source of fluid under pressure, a pump, a compressor, or the like, may be provided to establish and maintain the pressure differential or pressure gradient between the control fluid 15 in the pressure zone 14 and the fluid stream 22 in the passageway 20. If $p$ is greater than P, the fluid stream 22 is induced, forced, urged, or in some other diverse way caused to leak, seep, flow or pass, as indicated and illustrated by the dot-dash arrows, from the passageway 26 through the porous portion 18 of the fluid conveying means 12 into the pressure zone 14 and effectively create, maintain and control laminar flow, as indicated and illustrated by the solid arrows, in the fluid stream 22. However, under certain situations or for special applications it is desired that the flow fluid stream 22 be turbulent. In these situations the pressure $p$ is made less than the control fluid pressure P and control fluid from pressure zone 14 is caused to flow into the passageway 20 through the porous portion 18.

Figure 1:
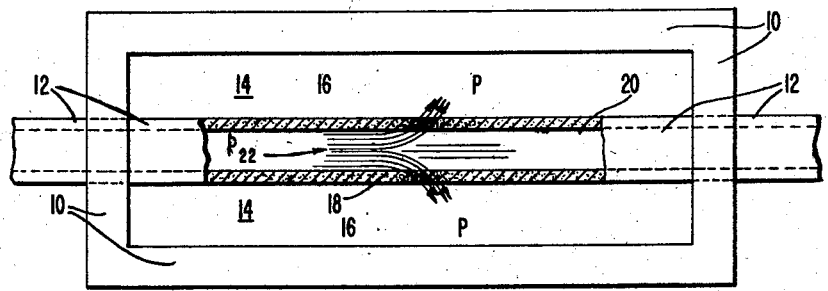
FIGURES 1 and 2 are partial sectional views illustrating one embodiment or modification of a system and apparatus for creating, maintaining and controlling laminar flow of a fluid stream.

In the embodiment or modification of the system and apparatus of this invention as illustrated in FIG. 1 laminar flow occurs in the fluid stream 22 since the fluid pressure P is less than the fluid stream pressure $p$ and in this embodiment or modification the control fluid 16 may be of the same type as the fluid of the fluid stream 22.

Figure 2:
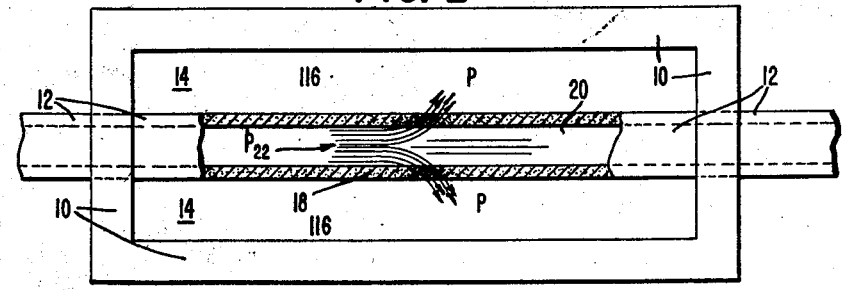

However, in certain instances or for special applications of the system and apparatus of this invention it may be desirable that the control fluid 16 be of a type different than that of the fluid of the fluid stream 22 in order to achieve the desired laminar flow in the fluid stream 22 and this embodiment or modification of the invention is illustrated in FIG. 2 of the drawing wherein a control fluid 116 is placed within the pressure zone 14 under a pressure P which is less than the fluid stream pressure $p$ of the fluid stream 22 which is passing in laminar flow through the passageway 20 in the fluid conveying means 12.

In other certain instances and in other special applications of the system and apparatus of this invention it may be desirable to vary the porosity of the fluid conveying means 12 along the longitudinal extent thereof which will in effect control the flow of the respective fluids from the pressure zone 14 to the passageway 20 or vice versa. It is possible to vary the porosity of the fluid conveying means 12 along the longitudinal extent thereof in several ways, one of which is illustrated in FIG. 3 wherein the entire longitudinal extent of the fluid conveying means 12 is formed from porous material the porosity of which varies throughout the extent thereof.

Another possibility is illustrated in FIG. 4 of the drawing wherein a plurality of porous portions 18—18—18 are provided for the fluid conveying means 12 with the porous portions 18—18—18 being longitudinally spaced at desired locations along the fluid conveying means 12.

Still another instance or special application of the system and apparatus of this invention may require that the porosity of the fluid conveying means 12 be maintained substantially constant throughout the longitudinal extent thereof but that the lateral thickness of the porous fluid conveying means 12 be varied along the longitudinal extent and this embodiment or modification is shown in FIG. 5 of the drawing wherein it is to be noted that the varying lateral thickness $T_1$, $T_2$ and $T_3$ of the fluid conveying means 12 are illustrated.

Also, the embodiments or modifications of the system and apparatus of this invention as illustrated in FIGS. 3, 4 and 5, i.e., varying the porosity of the fluid conveying means 12, enables the pressure $p$ of the fluid stream 22 to be varied in the down stream direction of the laminar flow thereof so that it is possible to use the varying pressures $p$ thereof at longitudinally spaced locations along the fluid conveying means 12 to provide output signals for controlling various devices.

Generally, it is desirable to have an increased or greater amount of flow of the fluid through the porous portion or portions 18 of the fluid conveying means 12 adjacent to the areas or extent where the fluid stream 22 has or possessed a high velocity while passing through the passageway 20 in the fluid conveying means 12. However, in FIG. 6 of the drawing there is illustrated an embodiment or modification of this invention which will satisfy instances, conditions or special applications wherein the system and apparatus requires that the conditions, as immediately described above, be reversed.

It has been found that usually, in order to maintain a high degree of integrity in the fluid stream 22 while passing through the passageway 20 that it is desirable, as illustrated in FIG. 3, to have high porosity in that portion of the fluid conveying means 12 which may be adjacent to the fluid stream 22 will have high velocity and vice versa; however, in certain instances, it may be desirable to vary the lateral thickness of the porous portion 18 of the fluid conveying means 12, as illustrated in FIG. 7 of the drawing, since it may be difficult to maintain a definite control over a continuously varying porosity of the porous portion 18 of the fluid conveying means 12 while maintaining the thickness substantially constant throughout the full extent thereof.

In still further instances or special applications of the system and apparatus of this invention it may be desirable that the pressure zone 14 be divided into a plurality of separate and independent compartments 24 by a plurality of partitions 26 which extend generally laterally from the fluid conveying means 12 to the primary object 10 with the partitions being longitudinally spaced along the fluid conveying means 12 and this embodiment or modification of this invention is illustrated in FIGS. 8 and 9 of the drawing wherein FIG. 8 shows the compartments 24 as being each filled with a like control fluid 216 which may or may not be similar to the fluid of the fluid stream 22. It is to be noted that the pressures P1, P2 and P3 of the control fluid 216 vary between the respective compartments 24.

In the embodiment or modification of this invention as illustrated in FIG. 9 different control fluids 316, 416 and 516 having equal pressures or different pressures, depending upon the demands, requirements, conditions or use of the system and apparatus are placed into the compartments 24 of the pressure zone 14.

It is to be understood that the pressures of the control fluid in each compartment may be varied in accordance with the demands, requirements, conditions or use of the system and apparatus of this invention and as illustrated in FIG. 8 the pressures P1, P2 and P3 are shown as increasing in the downstream direction of flow of the fluid stream 22 and if desired, the pressures of the control fluids 316, 416 and 516 may be similarly varied to that the fluid pressure $p$ of the fluid stream 22 may be maintained more constant throughout the laminar flow thereof through the passageway 20 particularly through relatively long passageways or drive lines.

Also, the embodiments or modifications of the system and apparatus of this invention as illustrated in FIGS. 8 and 9, i.e., varying the pressures $P_1$, $P_2$ and $P_3$ of FIG. 8 and the pressures of the different control fluids 316, 416, and 516 in FIG. 9, enables the pressure $p$ of the fluid stream 22 to be varied in the downstream direction of the laminar flow thereof so that it is possible to use the varying pressures $p$ thereof at longitudinally spaced locations along the fluid conveying means 12 to provide output signals for controlling various devices.

In one preferred mode of operation of this invention as illustrated in FIGURES 8 and 9, one or more of the pressures $P_1$, $P_2$ and $P_3$ may be made greater than the pressure $p$ of the fluid stream and one or more of the compartments 24 may be supplied with a fluid coolant from a refrigeration unit (not shown). For example, $P_1$ of FIGURE 8 may be greater than $p$ so that a fluid coolant supplied this compartment may be forced into the passageway 20 and there mixed with the warmer fluid of the fluid stream 22. This, of course, produces turbulence within the fluid stream which may be corrected downstream of the point of entry of the coolant by making pressures $P_2$ and $P_3$ less than P to again create laminar flow.

It is obvious therefore that the present invention not only reduces heating of the fluid system by producing laminar flow, but also provides means for entering a coolant directly into the fluid stream of the system. As a further aid in cooling the apparatus, the fluid stream 22 may be supplied from a source of refrigerated fluid.

It is also to be understood that in the embodiment or modification of this invention as illustrated in FIGS. 8 and 9 that the partitions 26 may be formed of porous material similar to the material used in the porous portion 18 of the fluid conveying means 12 or other suitable material depending upon the use of the invention. Further, the partitions 26 may be substantially equally spaced or unequally spaced along the longitudinal extent of the fluid conveying means 12.

In general the desired porosity of the fluid conveying means 12 usually depends upon the use of this invention.

It is also to be understood that the specific respective features of each of the embodiments or modifications, as described and disclosed above, of this invention are interchangeable one or more with the other in any selected combination thereof and that in each instance the resulting embodiment or possible modification thereof will have a pressure differential or gradient between the pressure of the control fluids which may be confined in the pressure zone 14 or compartments 24 and the pressure of the fluid stream 22 which may be passing through the passageway 20 of the fluid conveying means 12 and that the fluid conveying means 12 has, at least one porous portion 18.

Also, in the special application of the system and apparatus of this invention wherein same may be applied to fluid amplifiers, it is to be understood that the principles of this invention apply equally to both the power or control jet stream. That is, the principles of the present invention may be applied to fluid amplifiers of the type shown in the aforementioned publication to produce laminar flow in any or all of the fluid ducts whether they be power stream input, signal output, or control signal input ducts.

In some applications of the present invention, it may be preferable to provide means for varying the pressure P within the pressure zone 14 (FIG. 3) so that the pressure P may be selectively controlled to have a value which is greater than $p$ at one instant in time and less than $p$ at some subsequent time. Assume, for example, that the fluid conveying means 12 shown in FIGURE 3 comprises the power stream input and two input signal streams of a bistable fluid amplifier such as that shown on page 13 of the aforementioned publication. The opening into fluid passageway 13 is larger than the opening into fluid passageway 15 so that the fluid stream has a tendency to flow through passageway 13. As explained on page 83 of the publication, the fluid amplifier may be controlled by control signal inputs to cause the fluid stream to flow through either one of the output signal passageways. For the sake of clarity the control signal inputs are not shown in FIGURE 3.

Assume now that due to application a control signal, the fluid stream is now flowing through passageway 15, but it is desired to have it flow through passageway 13. According to the present invention, this may be accomplished by making the pressure P in pressure zone 14 greater than the pressure $p$ in the fluid stream 22. This destroys the laminar flow conditions within the fluid stream and creates a highly turbulent flow particularly at the neck or high porosity portion of the passageway. The induced turbulence upsets the conditions necessary for the fluid stream to continue flowing through passageway 15. The pressure P is now reduced to a value less than $p$ so that laminar flow conditions again prevail. Because the opening into passageway 13 is greater than the opening into passageway 15, the fluid stream will flow out through passageway 13. Thus, by raising P to a value greater than $p$ the principles of the present invention may be employed to erase conditions or reset components in a digital fluid system.

While the invention has been described, disclosed and illustrated in terms of several embodiments or modifications which it may assume in practice, the scope of the invention should not be deemed to be limited by the precise embodiments or modifications herein described, disclosed and illustrated, such other embodiments or modifications being intended to be reserved especially as they fall within the scope of the claims here appended.

I claim:

1. A system for controlling laminar flow in a fluid stream applied thereto, said system including fluid conveying means having a passageway therein through which said fluid stream may pass, said fluid conveying means having a plurality of porous control portions, means for defining a pressure zone about each porous portion of said fluid conveying means, control fluid disposed within each pressure zone, and means associated with each pressure zone for effecting a different pressure differential between the control fluid in each pressure zone and said fluid stream tending to force a portion of said fluid stream into each pressure zone.

2. A system for controlling laminar flow in a fluid stream applied thereto, said system including fluid conveying means having a passageway therein through which said fluid stream may pass, said fluid conveying means having at least one porous control portion, means for defining a pressure zone about each porous portion of said fluid conveying means, control fluid disposed within each pressure zone, and means associated with each pressure zone for effecting a pressure differential between the control fluid in each pressure zone and said fluid stream tending to force a portion of said fluid stream into each pressure zone, each porous control portion of said fluid conveying means having a porosity which varies throughout the extent thereof.

3. A system for controlling laminar flow in a fluid stream applied thereto, said system including fluid conveying means having a passageway therein through which said fluid stream may pass, said fluid conveying means having at least one porous control portion, means for defining a pressure zone about each porous portion of said fluid conveying means, control fluid disposed within each pressure zone, and means associated with each pressure zone for effecting a pressure differential between the control fluid in each pressure zone and said fluid stream tending to force a portion of said fluid stream into each pressure zone, each porous control portion of said fluid conveying means having a lateral thickness which varies throughout the extent thereof.

(References on following page)

References Cited by the Examiner

UNITED STATES PATENTS

| | | | |
|---|---|---|---|
| 2,130,498 | 9/38 | Klemschofski et al. | 138—177 XR |
| 2,517,820 | 8/50 | Aagaard | 50—11 |
| 2,760,518 | 8/56 | Peet | 138—30 |
| 2,821,205 | 1/58 | Chilton et al. | 137—13 |
| 2,838,073 | 6/58 | Mattia et al. | 138—30 |
| 2,843,138 | 7/58 | Gilman | 137—3 |
| 2,995,933 | 8/61 | Patton | 73—213 |
| 3,040,760 | 6/62 | Macks | 137—13 |
| 3,099,993 | 8/63 | Smith | 137—13 |

OTHER REFERENCES

Fluid Mechanics, by R. C. Binder, Third Edition, 1955, page 109.

LAVERNE D. GEIGER, *Primary Examiner.*

M. CARY NELSON, *Examiner.*